United States Patent
Duncan

(10) Patent No.: US 6,973,685 B2
(45) Date of Patent: *Dec. 13, 2005

(54) BLADDER STOPPER AND CONTROL ASSEMBLY

(76) Inventor: Scott Duncan, 3515 Plaintain Ct., Santa Rosa, CA (US) 95403

(*) Notice: Subject to any disclaimer, the term of this patent is extended or adjusted under 35 U.S.C. 154(b) by 0 days.

This patent is subject to a terminal disclaimer.

(21) Appl. No.: 10/106,304

(22) Filed: Mar. 25, 2002

(65) Prior Publication Data

US 2003/0009824 A1 Jan. 16, 2003

Related U.S. Application Data

(63) Continuation-in-part of application No. 09/888,186, filed on Jun. 21, 2001, now abandoned, and a continuation-in-part of application No. 09/834,148, filed on Apr. 12, 2001, now Pat. No. 6,484,329, which is a continuation-in-part of application No. 09/769,103, filed on Jan. 24, 2001, now abandoned.

(51) Int. Cl.[7] .............................................. E03C 1/23
(52) U.S. Cl. ................... 4/689; 4/693; 4/287; 4/255.07
(58) Field of Search ........................... 4/286, 287, 295, 4/688, 689, 693, 288, 255.04, 255.07; 251/57, 251/61.1

(56) References Cited

U.S. PATENT DOCUMENTS

| | | | | |
|---|---|---|---|---|
| 2,137,496 A | * | 11/1938 | Klein | |
| 2,598,207 A | * | 5/1952 | Bailey et al. | |
| 2,843,154 A | * | 7/1958 | Hosking | |
| 2,882,007 A | * | 4/1959 | Conlan | |
| 2,886,281 A | * | 5/1959 | Canalizo | |
| 3,480,021 A | * | 11/1969 | Ewald, Jr. | |
| 4,596,057 A | * | 6/1986 | Ohta et al. | 4/295 |
| 4,672,988 A | * | 6/1987 | Tash | 251/61.1 |
| 5,413,136 A | * | 5/1995 | Prescott | 251/61.1 |
| 5,787,521 A | * | 8/1998 | O'Connell et al. | 4/689 |
| 6,427,255 B1 | * | 8/2002 | Duncan | 4/295 |
| 6,484,329 B1 | * | 11/2002 | Duncan | 4/671 |

FOREIGN PATENT DOCUMENTS

AT 179269 * 8/1954 ................ 4/689

* cited by examiner

Primary Examiner—Timothy L. Maust
(74) Attorney, Agent, or Firm—Johnson & Stainbrook LLP; Craig M. Stainbrook; Larry D. Johnson

(57) ABSTRACT

An assembly for selectively blocking a drain to the passage of water. A drain emanating from a substantially circular opening in a basin, sink or tub is provided with a substantially cylindrical member releasably connected to the basin, sink or tub. The substantially cylindrical member is provided with a fluid inlet for receiving a pressurized fluid and an expandable bladder located within the substantially cylindrical member in fluid communication with the fluid inlet, wherein the bladder is sized and positioned such that when expanded, it blocks the drain to the passage of water. A mechanical pump is provided having a pump chamber and a stem emanating from it such that when the stem is moved, fluid pressure is applied to a hydraulic line connected to the fluid inlet for selectively expanding the bladder.

19 Claims, 4 Drawing Sheets

BLADDER STOPPER AND CONTROL ASSEMBLY

RELATED APPLICATIONS

The present application is a continuation-in-part of U.S. patent application Ser. No. 09/888,186, filed on Jun. 21, 2001 ABN, and U.S. patent application Ser. No. 09/834,148, filed on Apr. 12, 2001 U.S. Pat. No. 6,484,329, which is in turn a continuation-in-part of U.S. patent application Ser. No. 09/769,103, filed on Jan. 24, 2001, now abandoned.

TECHNICAL FIELD OF THE INVENTION

The present invention involves a stopper device for selectively blocking a drain to the passage of water which employs a bladder rather than conventional mechanical linkage. Such devices are more convenient to use than stoppers of the prior art and have the additional benefit that the stopper itself, as well as its actuating means, can be applied to a conventional basin, sink or tub far easier than stoppers of the prior art. In fact, the stopper device, as well as its actuating means, can be applied to a basin, sink or tub through the use of hand manipulation and without the need for the intervention of a plumber or use of tools.

BACKGROUND OF THE INVENTION

References made to FIG. 1 depicting a typical lavatory 10 employing a pop-up linkage 1 for mechanically blocking drain 2 to the passage of water. Although lavatory 10 is shown in cross-section as a typical sink installation, pop-up linkage 1 has been employed in virtually any plumbing installation in which selective blockage of wastewater through a drain is desired.

In installing pop-up linkage 1 in conjunction with lavatory 10, drain liner 11 and down pipe 12 are applied as two separate pieces. Drain liner 11 is applied from within the sidewalls of lavatory 10, while down pipe 12 engages drain 2 from below the lavatory. This requires the use of joint compound to make the appropriate attachment on site while maintaining the watertight integrity at drain 2. As noted, down pipe 12 is provided with protrusion 16, the need for of which will be more fully described below, preventing down pipe 12 from being inserted through drain 2 as a single piece with drain liner 11.

In continuing reference to FIG. 1, the prior art pop-up linkage 1 is provided with a pop-up stopper within down pipe 12 (not shown) which is movable vertically within down pipe 12 by raising and lowering stem 9. As noted, stem 9 is adjustably connected to perforated rod 18 through loosening or tightening of wing nut 8. Further, the arc of motion created in connecting rod 17 can further be adjusted by inserting connecting rod 17 into various openings 19 contained within perforated rod 18. In use, as stem 9 is raised or lowered vertically, connecting rod 17 is moved along a short arc of travel as a result of its capture within one of the openings 19 of perforated rod 18. This, in turn, causes a stopper contained within down pipe 12 to move vertically up or down as a distal end of connecting rod 17 connects to the body of the stopper through protrusion 16.

There are a number of deficiencies associated with the pop-up linkage of FIG. 1 which the present invention is intended to eliminate. For example, as noted previously, drain liner 11 and down pipe 12 must be applied to lavatory 10 in two pieces requiring an on site assembly with pipe joint compound to maintain a watertight connection. Further, down pipe 12 is connected to drain liner 11 by screwably engaging these members and by further pulling drain liner 11 tightly within sink opening 12 by threadably applying nut 14 used in conjunction with gasket 15. However, because of the necessity of providing down pipe 12 with protrusion 16, nut 14 cannot be applied from the lower extremity of down pipe 12. In reaching nut 14 once the installation is in place requires plumbing tools such as a channel wrench to tighten nut 14 over threads 13 within down pipe 12 by manipulating tools over and past protrusion 16.

In working under a typical drain, sink or tub installation, free space is not readily available, and it becomes a difficult chore and one lending itself to the intervention of a professional to apply the appropriate pop-up linkage to one's typical lavatory. Furthermore, as virtually any user of a pop-up linkage is aware, after repeated usage, the linkage tends to loosen and, over time, it becomes extremely difficult to actuate a stopper between fully closed and fully opened positions by the mere actuation of stem 9. At a minimum, adjustments seem to be commonly required at least through the repositioning of stem 9 through the use of wing nut 8, requiring below sink intervention which many users are reluctant to carry out. Finally, because connecting rod 17 is mechanically engaged within the body of the stem employed in any pop-up linkage configuration, it is impossible to remove the stopper without disassembly of pop-up linkage 1. This is oftentimes necessary when, for example, hair or other debris finds itself lodged within down pipe 12, the removal of which being required to free the drain for the free passage of wastewater.

There is, thus, an obvious need to improve upon the typical pop-up linkage assemblies of prior art. This and further objects of the present invention will be more readily apparent when considering the following disclosure and dependent claims.

SUMMARY OF THE INVENTION

The present invention is directed to an assembly for selectively blocking a drain to the passage of water. The drain, emanating from a substantially circular opening in a basin, sink or tub extends as a substantially cylindrical member releasably connected to the basin, sink or tub. The substantially cylindrical member is provided with a fluid inlet for receiving a pressurized fluid and an expandable bladder located within the substantially cylindrical member in fluid communication with the fluid inlet, wherein the bladder is sized and positioned such that when expanded, the bladder blocks the drain to the passage of water. A mechanical pump, having a pump chamber and a stem emanating from the pump chamber is further provided. When the stem is moved, fluid pressure is applied to a hydraulic line connected to the fluid inlet for selectively expanding the bladder.

DETAILED DESCRIPTION OF THE INVENTION

Figure 1:
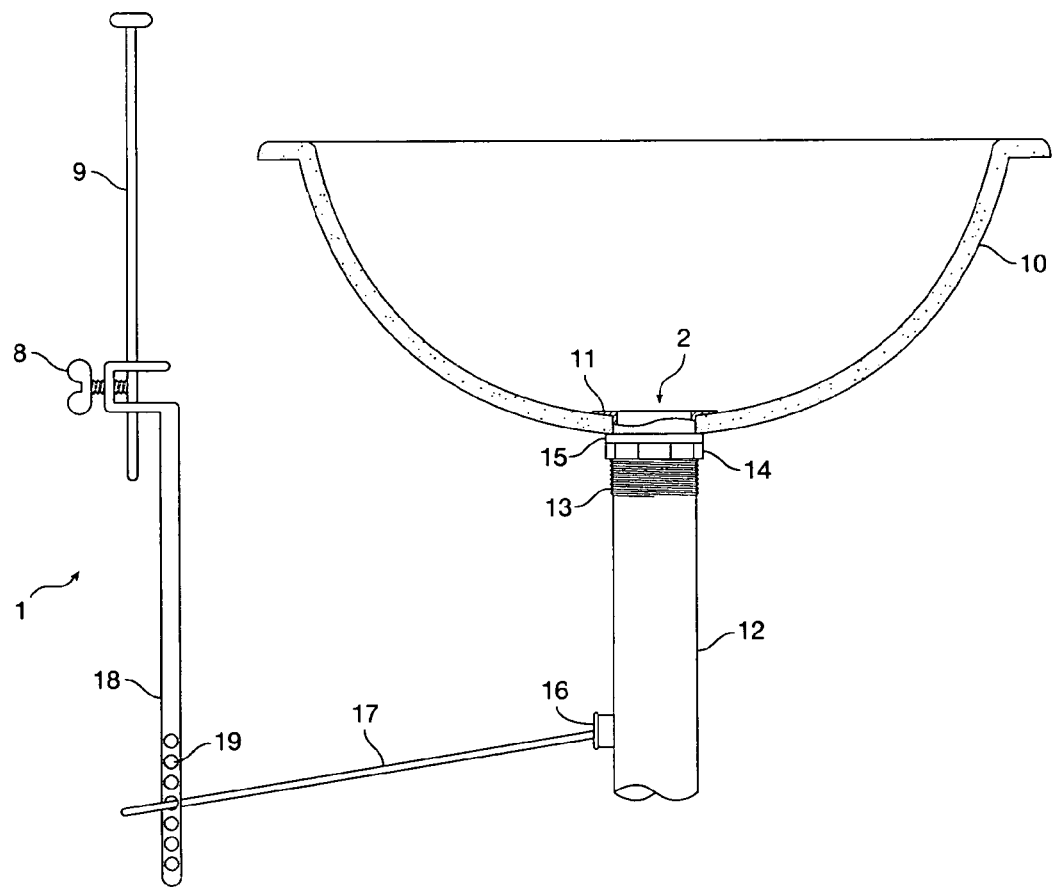
FIG. 1 is a side, partially cut-away view, of a pop-up linkage and drain assembly of the prior art.

As noted previously, one of the advantages of practicing the present invention is the ability to install the present stopper assembly within a lavatory more simply than the typical pop-up linkage depicted and described with regard to FIG. 1. To illustrate this point, reference is made to FIGS. 2A through 2C.

Figure 2A:
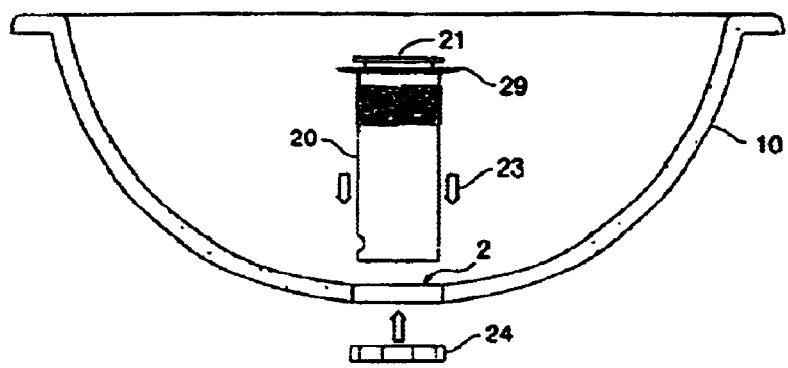
FIGS. 2A through 2C are a series of side, partially cut-away views, of a typical lavatory and the installation of a substantially circular member shown as being releasably connected to it in installing the stopper of the present invention.

Turning to FIG. 2A, a lavatory sidewall 10 is shown being provided with drain opening 2. Unlike the prior art, substantially cylindrical member 20 can be preassembled with circular disk portion 21 and inserted within opening 2 in the direction of arrows 23. Ledge 29 is sized to reside upon opening 2 maintaining substantially cylindrical number 20 in place. As such, the down pipe assembly can be installed through the practice of the present invention as a single piece, thus obviating the need for on-site assembly in carrying out the present installation.

Figure 2B:
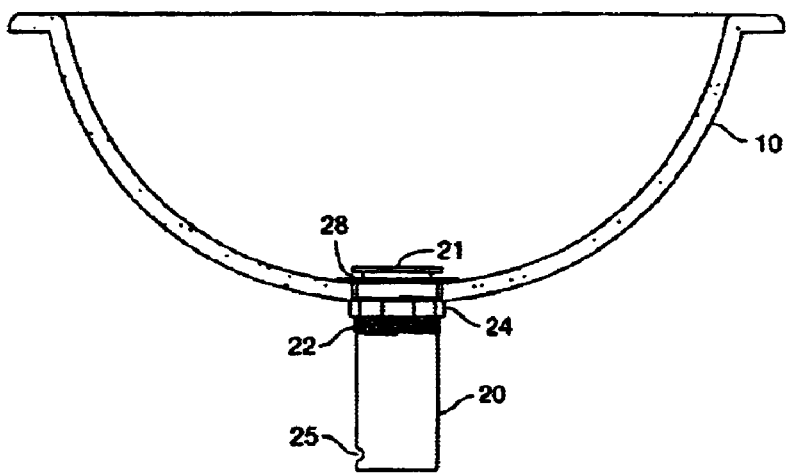

In turning to FIG. 2B, it is noted that the substantially cylindrical member 20 of the present invention does not require anything related to protrusion 16 (FIG. 1). As such, threaded nut 24 can be applied through the length of substantially cylindrical member 20 along threaded sidewall 22. This greatly enhances the ease of installation to the point where threaded nut 24 can be caused to engage the threaded sidewall 22 and screwed upon substantially cylindrical member 20 in capturing the bottom edge of lavatory 10 enabling substantially cylindrical member 20 to be installed without the need for tools. However, when additional tightening is deemed desirable, the present invention certainly contemplates the use of any suitable wrench to complete the installation.

Figure 2C:
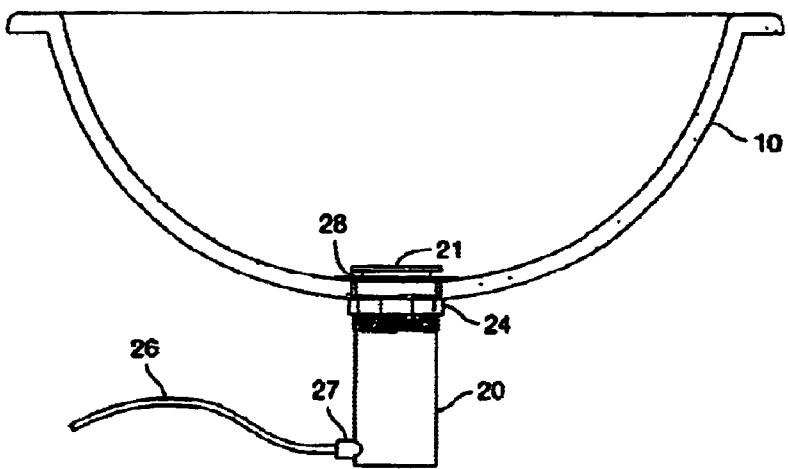

In further reference to FIGS. 2A through 2C, is noted that in recognizing the elimination of the need for a pop-up stopper in practicing the present invention, expanded substantially circular disc portion 21 can be permanently joined to bladder support assembly 40 (FIG. 4) prior to its installation within substantially cylindrical member 20 (FIG. 2A). In doing so, space 28 can be configured providing a passageway for wastewater drained from lavatory 10 through drain opening 2 within the internal volume of substantially cylindrical member 20. Oftentimes, by correctly sizing space 28 or by providing radial protrusions (not shown) within this space, hair or other debris which would otherwise pass within substantially cylindrical member 20 will "hang up" in this region and can be readily removed, thus providing a means for prophylactically preventing drain stoppage.

Once threaded nut 24 is applied to threaded sidewall 22 to complete the joining of substantially cylindrical member 20 to lavatory 10, hydraulic line 26 can be applied through nipple 27 as shown in FIG. 2C. Importantly, nipple 27 can be installed after the threaded nut 24 is applied as shown, such that nipple receiving port 25 presents no obstacle to the migration of threaded nut 24 in dramatic contrast to the impediment created by protrusion 16 (FIG. 1) of the prior art.

Figure 4:
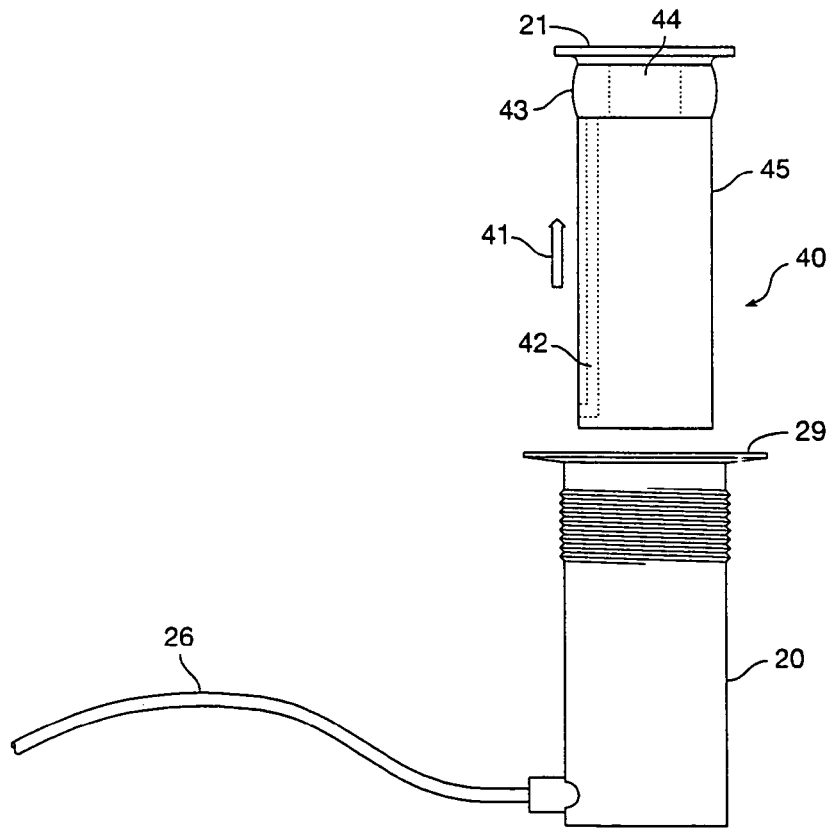
FIG. 4 is a side plan view depicting the removability of the stopper element of the present invention from the substantially cylindrical member which is releasably connected to the basin, sink or tub.

Turning to FIG. 4, the inner workings of the bladder-actuated stopper are depicted. As noted, substantially cylindrical member 20 is in the form of a substantially cylindrical pipe receiving hydraulic line 26 as shown. Nested within substantially cylindrical member 20 is bladder support assembly 40 which can be in the form of plastic body 45 including a hydraulic channel 42 for receiving pressurized hydraulic fluid through hydraulic line 26 and for feeding this fluid to and from bladder 43 which, itself, is supported by narrowed bladder support region 44. Clearly, as bladder 43 expands, its outer periphery engages the inner sidewall of substantially cylindrical member 20, thus blocking the latter to the passage of wastewater.

As is further apparent in viewing FIG. 4, bladder support assembly 40 can be selectively removed from substantially cylindrical member 20 by lifting bladder support assembly 40 in the direction of arrow 41. As such, in the event that hair or other debris is captured within the internal volume of substantially cylindrical member 20, a user could grasp bladder support assembly 40 by pulling upon expanded substantially circular disc portion 21 employing nothing more than one's thumb and forefinger nails. Once a debris is cleared, the bladder support assembly 40 can be reinserted within substantially cylindrical member 20 for further use as a bladder-actuated stopper device.

Figure 3:
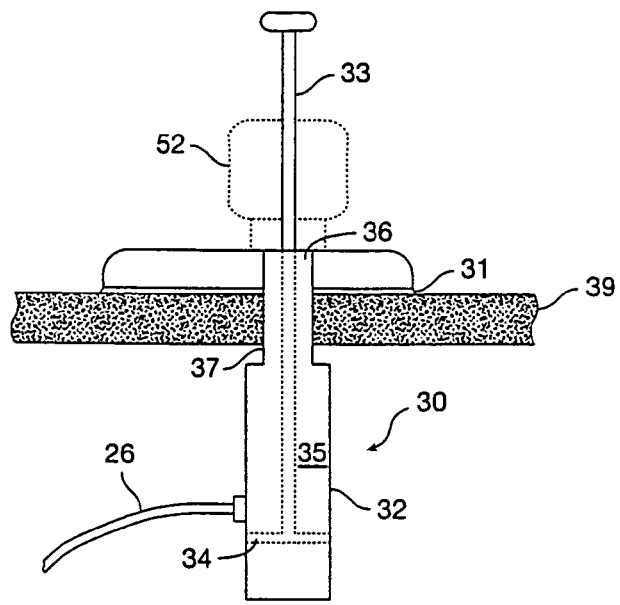
FIG. 3 is a side plan view of the mechanical pump portion of the present invention installed in conjunction with a lavatory installation.
Figure 5:
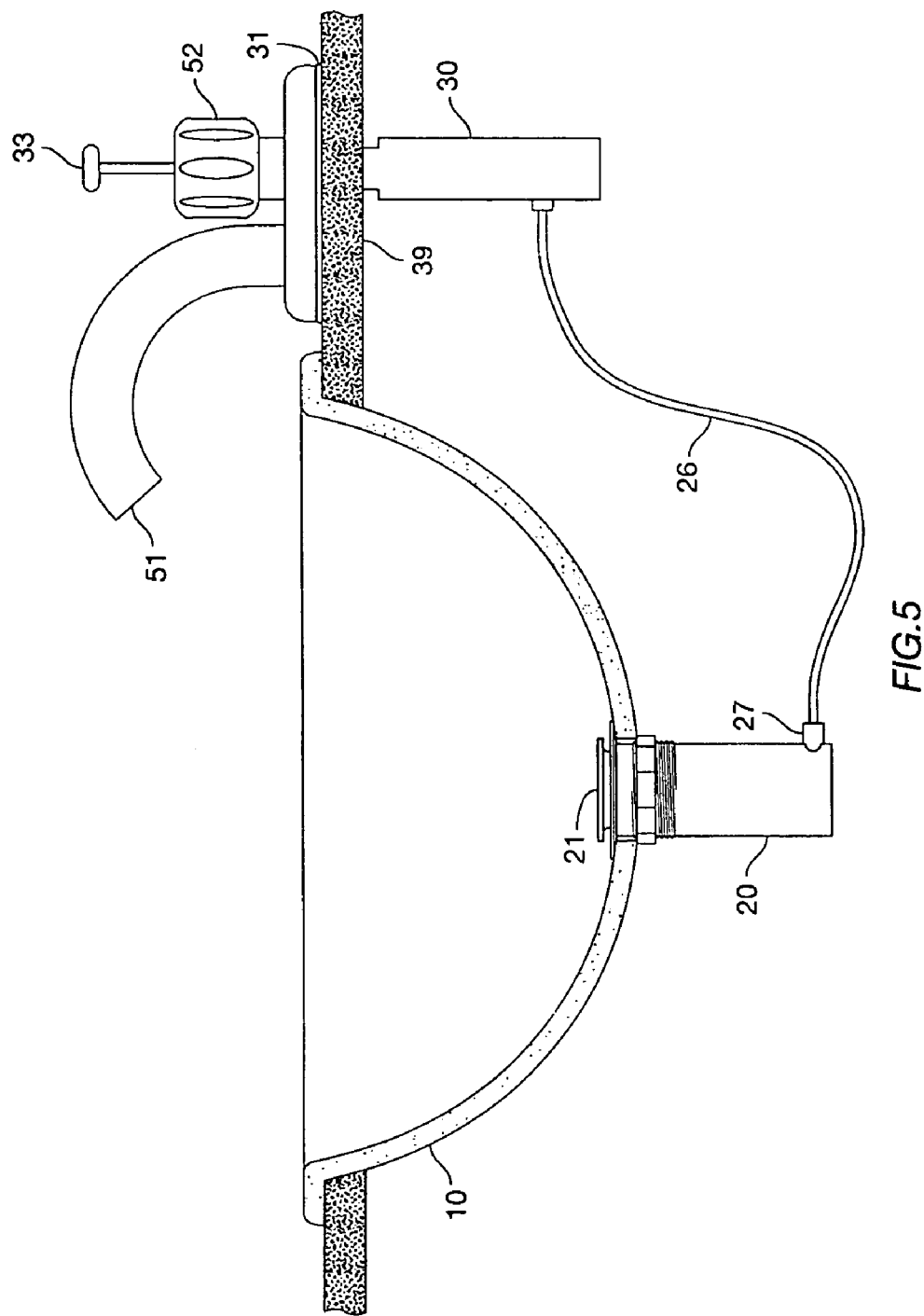
FIG. 5 is a side, partially cut-away view, of a typical lavatory assembly showing the installation of the present invention therein.

As noted previously, hydraulic fluid is fed to bladder 43 by introducing hydraulic fluid under pressure through hydraulic line 26. In turning to FIG. 3, a convenient means of providing pressurized fluid is shown. Specifically, pump 30 is shown appended to ledge 39 which is generally part of the basin, sink or tub assembly. Virtually all water service assemblies, such as shown in FIG. 5 are provided with sealing gasket 31. Sealing gasket 31 is provided with an opening 36 used currently to provide for the pass through of stem 9 of the prior art (FIG. 1). This same sealing gasket 31 can be employed to receive and maintain mechanical pump 30.

Body portion 32 is generally in the shape of a cylinder, having an internal volume which is variable. Hydraulic volume 35 is varied by actuation of plunger 33 which, in turn, moves diaphragm 34 in producing a hydraulic plunger assembly. As such, by depressing stem 33, hydraulic volume 35 is increased which, in turn, decreases hydraulic pressure within line 26 which resultingly contracts bladder 43. When plunger 33 is pulled upwardly, hydraulic volume 35 decreases, causing an increase in hydraulic line pressure and consequent expansion of bladder 43.

As shown in FIG. 5, the mechanical pump assembly 30 can be placed within a typical water service assembly composed of a water valve 52 and spigot 51 such that stem 33 is located through shelf 39 in a location suggesting a pop-up multi-link assembly, such as shown in FIG. 1. Hydraulic line 26 can, in a rather straightforward fashion, progress from mechanical pump 30 to substantially cylindrical member 20 through nipple 27 as shown.

As suggested previously, ease of installation is a clear advantage in practicing the present invention. In turning to FIG. 3 it is noted that mechanical pump 3 can be inserted through open 36 in plastic sealing gasket 31 which is part of the water service assembly that includes water valve 52 and spigot 51. Neck portion 37 can include a threaded ramp so that replacement of mechanical pump 30 can be as simple as turning body portion 32 a quarter turn by hand resulting in the threaded ramp disengaging from sealing gasket 31 and releasing below shelf 39.

As noted, both mechanical pump 30 as well as the bladder stopper assembly which includes substantially cylindrical member 20 and bladder support assembly 40 could be installed by mere hand manipulation and without the need for the use of tools whatsoever. In doing so, substantially cylindrical member 20 could be dropped within drain 2 and secured by washer 24 (FIGS. 2A through 2C). The hydraulic line 26 could then be attached at nipple receiving port 25 and the hydraulic line then extended to mechanical pump 30 which, as shown, can be secured to ramp washer 31 by a quarter turn again carried out by hand.

In view of the above, it is readily apparent that the present invention provides a dramatic improvement to stopper devices of the prior art which are generally characterized by FIG. 1. It is further noted that although any fluid can be employed in providing hydraulic pressure to bladder 43, it is particularly anticipated that a user would employ a gas such as air, particularly if a closed system is contemplated. The use of a liquid, such as water, could result in unacceptable contamination as the water within the closed system would be stagnant and thus represent a breeding ground for bacteria. In fact, numerous government agencies have recognized bacterial problems as a result of stagnant water and have, by and large, legislated against any such system employable at or proximate to a water service intended to dispense potable water.

What is claimed is:

1. An assembly for selectively blocking a drain to the passage of water, said drain emanating from a substantially circular opening in a basin, sink or tub, and extending as a substantially cylindrical member releasably connected to said basin, sink or tub, said substantially cylindrical member having a fluid inlet for receiving a pressurized fluid and an expandable bladder located within said substantially cylindrical member in fluid communication with said fluid inlet wherein said bladder is sized and positioned such that when expanded, said bladder blocks said drain to the passage of water and a mechanical pump having a pump chamber, and a stem emanating from said pump chamber, such that when said stem is moved, fluid pressure is applied to a hydraulic line connected to said fluid inlet for selectively expanding said bladder.

2. The assembly of claim 1 wherein said fluid comprises a gas.

3. The assembly of claim 2 wherein said gas comprises air.

4. The assembly of claim 1 wherein said substantially cylindrical member is attachable to said basin, sink or tub through the use of a unitary ledge sized to reside over said substantially circular opening.

5. The assembly of claim 4 wherein said substantially cylindrical member is provided with an outer threaded sidewall such that a threaded nut can be applied along the length of said substantially cylindrical sidewall to maintain engagement between said substantially cylindrical member and said basin, sink or tub.

6. The assembly of claim 4 wherein said mechanical pump further comprises a plunger which can be actuated by movement of said stem.

7. The assembly of claim 6 wherein said mechanical pump is appended to said basin, sink or tub such that said pump chamber is not visible to a user and said stem protrudes through said basin, sink or tub for actuation by a user.

8. The assembly of claim 7 wherein said stem is caused to protrude vertically from said basin, sink or tub such that pulling up said stem causes fluid to expand said bladder blocking said drain and pushing down upon said stem causes fluid to withdraw from said bladder opening said drain to the passage of water.

9. The assembly of claim 7 wherein said mechanical pump can be installed upon and removed from said basin, sink or tub by hand manipulation and without the need for tools.

10. The assembly of claim 5 wherein said substantially cylindrical member can be installed upon and removed from said basin, sink or tub by hand manipulation of said threaded nut and without the need for tools.

11. The assembly of claim 1 wherein said bladder is removable from said drain by withdrawing said bladder through said substantially circular opening by hand manipulation and without the need for tools.

12. The assembly of claim 1 wherein said substantially cylindrical member further comprises a nipple receiving port for attachment of said hydraulic line thereto.

13. The assembly of claim 1 wherein said substantially cylindrical member houses a bladder support assembly having a body portion which includes a hydraulic channel for receiving pressurized hydraulic fluid from said mechanical pump and feeding said hydraulic fluid to said bladder.

14. The assembly of claim 13 wherein said bladder support assembly is provided with an expanded substantially circular disc wherein when installed, said expanded substantially circular disc resides within said basin, sink or tub as said bladder support assembly protrudes within said substantially cylindrical member.

15. A method of installing an assembly for selectively blocking a drain to the passage of water, said drain emanating from a substantially circular opening in a basin, sink or tub and extending as a substantially cylindrical member releasably connected to said basin, sink or tub, said substantially cylindrical member having a fluid inlet for receiving a pressurized fluid and an expandable bladder located within said substantially cylindrical member in fluid communication with said fluid inlet wherein said bladder is sized and positioned such that when expanded, said bladder blocks said drain to the passage of water and further including a mechanical pump having a pump chamber, and a stem emanating from said pump chamber such that when said stem is moved, fluid pressure is applied to a hydraulic line connected to said fluid inlet for selectively expanding said bladder, said method comprising applying said substantially cylindrical member to said substantially circular opening and applying said mechanical pump to an opening in a ledge proximate to said basic, sink or tub whereupon said hydraulic link is connected between said substantially cylindrical member and said mechanical pump.

16. The method of claim 15 wherein said substantially cylindrical member is retained to said substantially circular drain opening through the use of a threaded nut captured by a threaded sidewall of said substantially cylindrical member.

17. The method of claim 16 wherein said threaded nut is applied by hand such that said substantially cylindrical member can be retained without the use of tools.

18. The method of claim 15 wherein a plastic sealing gasket is applied to said opening in said ledge for releasably retaining said mechanical pump.

19. The method of claim 16 wherein said mechanical pump can be retained by said plastic sealing gasket by applied said mechanical pump to said plastic sealing gasket by hand without the use of tools.

* * * * *